Sept. 29, 1931.  W. R. TALIAFERRO  1,824,846
CONTROL SYSTEM
Filed Jan. 30, 1930
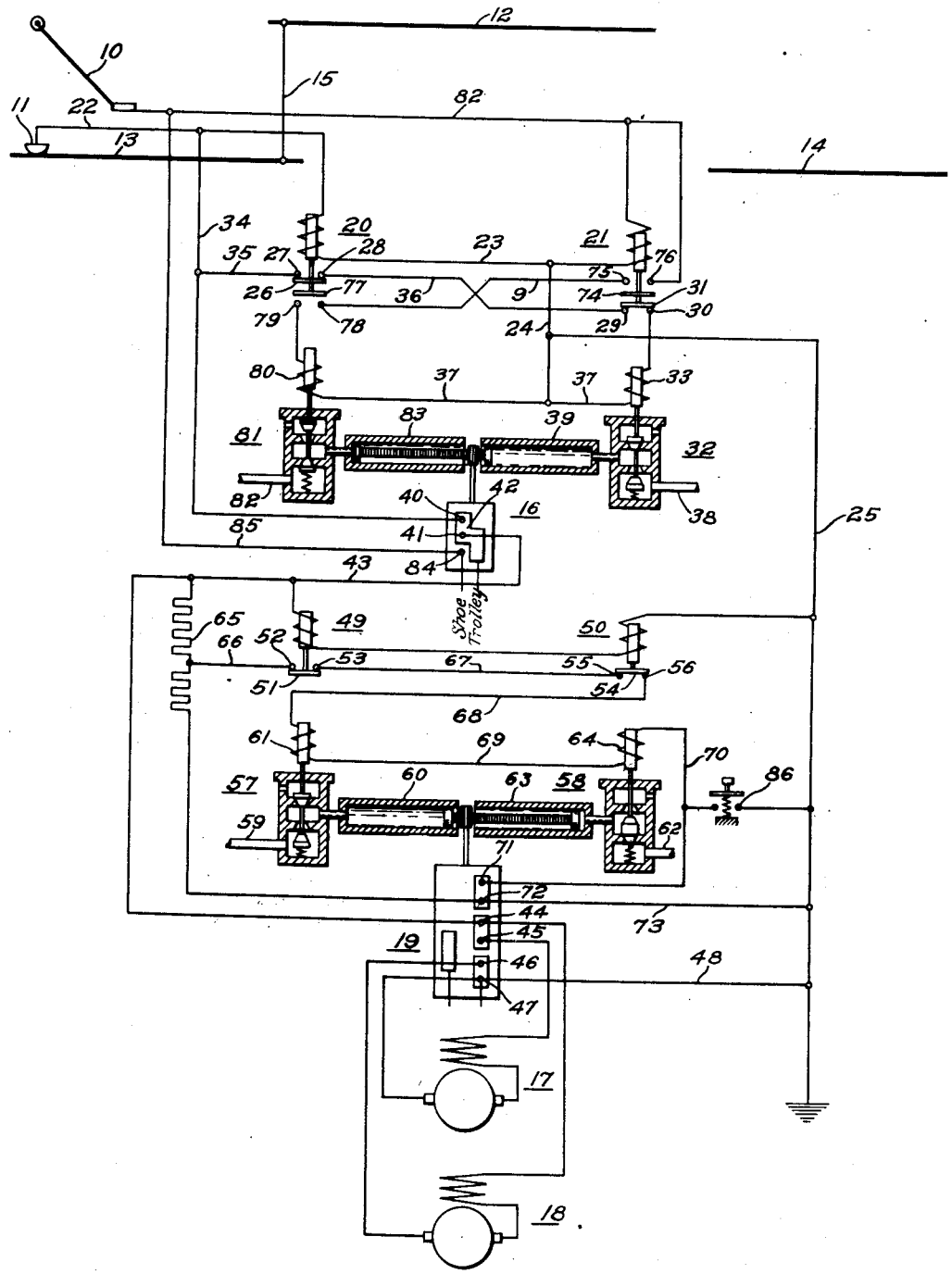
INVENTOR
William R. Taliaferro.
BY
*[signature]*
ATTORNEY Patented Sept. 29, 1931

1,824,846

UNITED STATES PATENT OFFICE

WILLIAM R. TALIAFERRO, OF PITTSBURGH, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed January 30, 1930. Serial No. 424,516.

My invention relates to improvements in control systems and particularly to control systems for electric vehicles wherein the motors may be connected to different supply conductors of the same or different voltage.

In order to supply power to the motors of electric vehicles, it is the usual practice, in electric railway systems, to provide supply conductors of different types for different portions of the system. An overhead conductor may be suitable for use on certain portions of the railway system while, on other portions, a third rail may be more satisfactory. Therefore, it is customary to furnish the vehicle with two or more current-collecting devices adapted to cooperate with conductors of the respective types. Heretofore, no means have been provided for automatically transferring the motor connections from one current collector to another as the vehicle moves from a section of the system where an overhead supply conductor is provided to a section provided with a third rail.

It is an object of my invention to provide for automatically changing motor-circuit connections, upon changes in the operating conditions, to connect the motors to the power source through the proper current collector.

Another object of the invention is to provide for automatically controlling the circuit relation in which the motors of a vehicle are connected, according to the voltage of the power source.

According to my invention, the operation of electro-pneumatic drum-switches is so controlled by relays as to automatically transfer the motor connections from a trolley to a third-rail shoe or vice versa and also to automatically connect the motors in series or in parallel-circuit relation, according to the voltage of the power source.

For a full understanding of the nature and objects of the invention, reference may be had to the following detailed description, taken in conjunction with the accompanying drawing, in which the single figure is a diagram of a control system connected in accordance with my invention.

Referring to the drawing, a trolley 10 and a third-rail shoe 11 may be of any standard type used on electric vehicles. The trolley 10 is mounted on an electric vehicle (not shown) in such manner as to collect current from an overhead conductor 12, while the shoe 11 is disposed to collect current from a third rail 13. For illustrative purposes, it will be assumed that the voltage of the third rail 13 and that of the overhead conductor 12 are the same, for example, 600 volts, also, that the voltage of a third rail 14 is 1200 volts. Since the voltage of the overhead conductor 12 and that of the third rail 13 are the same, they may be interconnected by a conductor 15, as shown. But, since the voltages of the overhead conductor 12 and the third rail 14 are different, a dead section, over which the vehicle must coast, is provided.

As the vehicle moves from a section supplied by a third rail 13 to a section supplied by the overhead conductor 12, a drumswitch 16 is actuated to transfer the connections of the motors 17 and 18 from the shoe 11 to the trolley 10.

When the vehicle moves from the overhead conductor 12 to the third rail 14, the motor connections are transferred from the trolley 10 to the shoe 11. Also, since the voltage of the third rail 14 is 1200 volts and the voltage of the conductor 12 is 600 volts, a drumswitch 19 is actuated to change the motors 17 and 18 from parallel to series-circuit relation. When the motors are transferred from a 1200 to a 600 volt source of power, they are changed from series to parallel-circuit relation.

Assuming that the vehicle is travelling with the shoe 11 in contact with the third rail 13, then the apparatus will stand in the position shown on the drawing. A voltage relay 20 is energized while a relay 21 is deenergized. The circuit through the relay 20 extends from the third rail 13, shoe 11, conductor 22, the coil of relay 20, conductor 23 and conductor 24, to the grounded conductor 25. The relay 20 being energized, its contact-bridging member 26 bridges the two contact members 27 and 28.

Since the relay 21 is deenergized, its contact members 29 and 30 are bridged by a contact-bridging member 31.

Therefore, the magnet valve 32 of an air engine provided for actuating the drum 16 is energized. The energizing circuit extends from conductor 22, through conductors 34 and 35, the contact members 27 and 28—bridged by member 26, conductor 36, the contact members 29 and 30, of the relay 21—bridged by member 31—the actuating coil 33, conductor 37 and conductor 24, to the grounded conductor 25. When the magnet valve 32 is energized, the core is pulled down, and air is admitted from a pipe 38 to the cylinder 39.

As shown, the drum switch 16 is in the "shoe" position, thereby establishing a circuit which extends from the energized conductor 34, through contact members 40 and 41—bridged by a contact segment 42—conductor 43, contact members 44 and 45 of the drum switch 19, which is in the "parallel" position, motors 17 and 18, connected in parallel-circuit relation, contact members 46 and 47 and conductors 48 and 25, to ground.

The operation of the drum-switch 19 is controlled by two voltage relays 49 and 50 which are connected between conductor 43 and ground. In this instance, the relay 49 is designed to function on the application of 600 volts and, in this system, serves as a low-voltage relay. The relay 50 is a high-voltage relay, that is, in this instance, it responds only to 1200 volts. When the relay 49 is energized the bridging member 51 is actuated to bridge the contact members 52 and 53 and when the relay 50 is energized, the contact-bridging member 54 is raised to interrupt the circuit through the contact members 55 and 56.

The drum switch 19 may be actuated to connect the motors 17 and 18 either in series or in parallel-circuit relation. The drum switch is operated by two air magnet valves 57 and 58. The magnet valve 57 is a standard magnet valve, that is, it will admit air from a pipe 59 to a cylinder 60 when the coil 61 is energized and it will permit air to be exhausted from the cylinder 60 when the coil 61 is deenergized. The magnet valve 58 is an inverted magnet valve. It will admit air from a pipe 62 to the cylinder 63 when the coil 64 is deenergized and exhaust air from the cylinder 63 when the coil 64 is energized.

A control resistor 65, connected between the conductor 43 and ground, is utilized to provide a low-voltage control source. In case it is desired to omit this resistor, a battery or other source may be used for control purposes.

As shown, the coils 61 and 64 of the magnet valves 57 and 58, respectively, are connected across a section of the resistor 65. The circuit extends from the resistor, through conductor 66, the contact members 52 and 53 of the relay 49, conductor 67, contact members 55 and 56 of the relay 50, the conductor 68, the actuating coil 61 of the air valve 57, conductor 69, the actuating coil 64 of the air valve 58, conductor 70, the contact members 71 and 72 of the drum switch 19 and conductor 73, to the grounded conductor 25.

When the vehicle reaches the section wherein power is supplied through the overhead trolley conductor 12, the motor connections will be transferred from the shoe 11 to the trolley 10. Assuming that the trolley 10 engages the conductor 12, then an energizing circuit for the relay 21 is established. As shown, this circuit extends from the trolley 10, through conductor 82, the actuating coil of the relay and conductor 25, to ground.

When the shoe 11 is disengaged from the third rail 13, the relay 20 is deenergized and the bridging member 77 drops into engagement with the contact members 78 and 79, thereby establishing a circuit through coil 80 of magnet valve 81. This circuit extends from the conductor 12, through the trolley 10, conductor 82, contact members 75 and 76—bridged by member 74—conductor 9, contact members 78 and 79—bridged by member 77—the actuating coil 80 of the magnet valve 81, conductor 37 and conductor 24, to the grounded conductor 25. The magnet valve 81 admits air from a pipe 82 to a cylinder 83, while the magnet valve 32 permits the exhausting of air from the cylinder 39, since the coil 33 is deenergized when the relay 21 is energized. Consequently, the drum switch 16 is actuated to the position designated "trolley", and the motors 17 and 18 are connected to the trolley 10 through conductor 43, contact members 41 and 84—bridged by the contact segment 42—and conductor 85.

Since the third rail 13 and the conductor 12 are of the same voltage, the drum-switch 19 will not be actuated at this time, and the motors 17 and 18 will remain connected in parallel-circuit relation.

When the vehicle passes from a low-voltage section to a high-voltage section, that is, from the conductor 12 to the third rail 14, the motor connections will be transferred from the trolley 10 to the shoe 11, also, the connections of the motors 17 and 18 will be changed from parallel to series-circuit relation. In order that the equipment shall not be subjected to over-voltage a dead section, over which the vehicle must coast, is provided.

As soon as the trolley 10 is disengaged from the conductor 12, the relay 21 will be deenergized. When the shoe 11 engages the third rail 14, the relay 20 is energized, and the drum-switch 16 returned to the position designated "shoe". When the trolley 10 passes beyond the end of the conductor 12, the low-volatge relay 49 is deenergized and the circuit through the coils 61 and 64 of the magnet valves 57 and 58, respectively, is interrupted.

As previously described, the magnet valve 57, when deenergized, permits the exhausting of air from the cylinder 60, and the magnet valve 58 admits air to the cylinder 63. The result is that the drum-switch 19 is actuated to the "series" position, connecting the motors 17 and 18 in series-circuit relation. Therefore, when the shoe 11 engages the high-voltage rail, the motors are connected in series to receive 1200 volts. The relays 49 and 50 will both respond to this high voltage, and the relay 50 will prevent the establishment of a circuit through coils 61 and 64 of the magnet valves 57 and 58.

In passing from a high-voltage section to a low-voltage section, the push-button switch 86 must be closed after the low-voltage line is reached in order to actuate the drum 19 from the "series" to the "parallel" position. When the dead section between the trolley conductor and the third rail is reached, the conductor 43 is disconnected from the power source and relays 49 and 50 are deenergized. The drum-switch 19 will not be rotated from the "series" to the "parallel" position until after the low-voltage section of the road is reached. Assuming that the vehicle reaches the low-voltage section of the road, then the relay 49 is actuated. The relay 50, being designed to respond only to a voltage in the neighborhood of 1200, continues to stand in its lowermost position. Therefore, when the push-button switch 86 is closed, an energizing circuit for the magnet valves 57 and 58 is established. The coils 61 and 64 are energized and the magnet valve 57 will admit air to the cylinder 60, and the valve 58 will exhaust air from the cylinder 63, thereby operating the drum-switch 19 to the "parallel" position. After this drum has moved to the "parallel" position, a holding circuit for the coils 61 and 64 is established through contact members 71 and 72, and the push button 86 may be released.

It will be seen that a failure of power will operate the control apparatus and connect the motors in series-circuit relation, so that the maximum voltage of the system may be applied without damaging them. Extremely low voltage on the line will also cause the motors to be connected in series-circuit relation. A drop in voltage when the vehicle is operating on the high-voltage line will not cause the drum-switch to change to low-voltage connections, first, because both the relays 49 and 50 are so designed that they will continue in their energized positions when voltages well below the voltage on which the low-voltage relay 49 closes are impressed upon them and, second, because the push button 86 normally stands open. Therefore, the drum 19 cannot be actuated under such conditions.

It is evident that I have provided a means for automatically connecting the motors of an electric vehicle to either a shoe or a trolley and means for connecting the motors in series or in parallel-circuit relation, depending on the voltage of the power source. I also prevent the motors being changed from the series or high-voltage connection to the parallel or low-voltage connection upon a failure of the supply voltage.

The electro-pneumatic drum switches described in the foregoing are not essential, as magnetic contactors, relays, electro-pneumatic unit switches or changeover relay contacts may be utilized, depending on the voltages and currents to be employed.

I do not desire to restrict myself to the specific embodiment of my invention herein shown and described since it is evident that it may be changed and modified without departing from the spirit and scope of my invention as defined in the appended claims.

I claim as my invention:

1. In a motor-control system, in combination, electric motors disposed to be connected in series or in parallel-circuit relation, a plurality of supply conductors for the motors, means responsive to the energization of one of the supply conductors for automatically connecting the motors to said supply conductor, and means responsive to the voltage of said supply conductor for automatically connecting the motors in series or in parallel-circuit relation.

2. In a motor-control system, in combination, electric motors disposed to be connected in series or in parallel-circuit relation, a plurality of supply conductors for the motors, means responsive to the energization of one of the supply conductors for automatically connecting the motors to said supply conductor, and means responsive to the voltage of said supply conductor for connecting the motors in series or in parallel-circuit relation, said means being disposed to prevent an automatic changeover from a series connection to a parallel connection upon failure of the supply voltage.

3. A switching system for changing the circuit connections of the propelling motors of a motor vehicle when it passes from one supply conductor to another comprising, in combination, a plurality of current collectors carried by the vehicle and disposed to engage the supply conductors, means responsive to the voltage of the supply conductor engaged by a current collector to connect the current collector to the motors to establish a motor circuit to the supply conductor, and means responsive to the voltage imposed on the supply conductor for connecting the motors in series or in parallel-circuit relation according as the voltage is above or below a predetermined value.

4. A switching system for changing the circuit connections of the propelling motors of a motor vehicle when it passes from one supply conductor to another comprising, in combination, a plurality of current collectors carried by the vehicle and disposed to engage the supply conductors, means controlled by relays responsive to the voltage of the supply-conductor engaged by a current collector to connect the current collector to the motors to establish a motor circuit to the supply conductor, and means controlled by relays responsive to the voltage of the supply conductor for connecting the motors in series or in parallel-circuit relation according as the voltage is above or below a predetermined value.

5. In a motor-control system, in combination, electric motors disposed to be connected in series or in parallel-circuit relation, a plurality of supply conductors for the motors, means responsive to the energization of one of the supply conductors for automatically connecting the motors to said supply conductor, means responsive to the voltage of of the supply conductors for automatically connecting the motors in series or in parallel-circuit relation, and manually-operable means for preventing an automatic changeover from a series connection to a parallel connection upon failure of the supply voltage.

6. In a motor-control system, in combination, electric motors disposed to be connected in series or in parallel-circuit relation, a plurality of supply conductors for the motors, means responsive to the energization of one of the supply conductors for automatically connecting the motors to said supply conductor, means for preventing the motors from being connected to more than one supply conductor at a time, means responsive to the voltage of said supply conductor for automatically connecting the motors in series or in parallel-circuit relation, said means being disposed to connect the motors in series-circuit relation when the applied voltage exceeds a predetermined value, and manually-operable means for preventing an automatic changeover from a series to a parallel connection in case the applied voltage falls below a predetermined value.

In testimony whereof, I have hereunto subscribed my name this 21st day of January, 1930.

WILLIAM R. TALIAFERRO.